United States Patent
Sunaga et al.

(10) Patent No.: US 6,594,652 B1
(45) Date of Patent: *Jul. 15, 2003

(54) ELECTRONIC DISCUSSION SYSTEM FOR EXCHANGING INFORMATION AMONG USERS CREATING OPINION INDEXES IN ACCORDANCE WITH CONTENT OF EACH OPTIONS

(75) Inventors: Yoshiaki Sunaga, Yokohama (JP); Atsushi Komatsuzawa, Hiratsuka (JP); Tetsuji Ohno, Yokohama (JP); Noriyuki Takahashi, Yokohama (JP)

(73) Assignee: Hitachi, Ltd., Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 09/487,475

(22) Filed: Jan. 19, 2000

Related U.S. Application Data (63) Continuation of application No. 08/904,552, filed on Aug. 4, 1997, now Pat. No. 6,094,675.

(30) Foreign Application Priority Data

Aug. 2, 1996 (JP) .............................................. 8-204793

(51) Int. Cl.[7] .............................................. G06F 17/30
(52) U.S. Cl. ........................ 707/2; 707/4; 707/7; 707/9; 707/100; 707/102; 707/104.1; 345/733; 345/758; 709/206
(58) Field of Search .................... 707/1–10, 100–104.1, 707/200–205, 500.1, 501.1, 512–513; 345/758, 748, 752, 759, 473, 856, 733, 839, 753, 721; 709/200, 203–210, 217–218, 227–228; 370/260; 348/14.08, 14.03; 705/26, 37

(56) References Cited

U.S. PATENT DOCUMENTS

| | | | |
|---|---|---|---|
| 5,315,469 A | 5/1994 | McNeil | 360/119 |
| 5,377,354 A | 12/1994 | Scannell et al. | 709/103 |

(List continued on next page.)

FOREIGN PATENT DOCUMENTS

| | | |
|---|---|---|
| JP | 3152641 | 6/1991 |
| JP | 7325749 | 12/1995 |

OTHER PUBLICATIONS

Kenichi Kamiya et al., Grassroots: A system providing a uniform framework for communicating, structuring, sharing informtion, and organizing people, computer networks and ISDN Systems 28, issues 7–11, May 1996, pp 1157–1174.*

Kamiya et al., "Grassroots: A system providing a uniform framework for communicating, structuring, sharing information, and organizing people," *Computer Networks and ISDN Systems*, 28 (1996) 1157–1174.

(List continued on next page.)

*Primary Examiner*—Srirama Channavajjala
(74) *Attorney, Agent, or Firm*—Antonelli, Terry, Stout & Kraus, LLP (57) ABSTRACT

An electronic discussion system including discussion terminals for writing and managing opinion information and clients for accessing the discussion terminals through a network. The electronic discussion system comprises a discussion apparatus for storing contents of input opinions so as to have correspondence relationships with discussion topics to which the contents pertain, contents of opinions having correspondence relationships with discussion topics in which registered users participate further having correspondence relationships with user divisions corresponding to the registered users; a participated discussion reading (client) terminal responsive to an operation instruction from a registered user, for referring to and displaying contents of opinions stored in the discussion server and having a corresponding relationship with a user division corresponding to the registered user; and a non-participated discussion reading (client) terminal responsive to an operation instruction from a user other than the registered users, for inputting an instruction for selecting a discussion topic, and obtaining and displaying contents of opinions stored in the discussion apparatus and having a correspondence relationship with the selected discussion topic.

10 Claims, 8 Drawing Sheets

U.S. PATENT DOCUMENTS

| | | | | |
|---|---|---|---|---|
| 5,493,692 | A | | 2/1996 | Theimer et al. ............ 455/26.1 |
| 5,563,804 | A | * | 10/1996 | Mortensen et al. .......... 348/722 |
| 5,615,131 | A | * | 3/1997 | Mortensen et al. .......... 709/206 |
| 5,675,788 | A | | 10/1997 | Husick et al. ............ 707/104.1 |
| 5,715,466 | A | * | 2/1998 | Flanagan et al. ............... 704/2 |
| 5,721,763 | A | * | 2/1998 | Joseph et al. ............ 379/114.1 |
| 5,764,916 | A | * | 6/1998 | Busey et al. ............. 707/501.1 |
| 5,781,189 | A | * | 7/1998 | Holleran et al. ............. 345/826 |
| 5,793,365 | A | * | 8/1998 | Tang et al. ................. 345/758 |
| 5,828,839 | A | * | 10/1998 | Moncreiff ................... 709/204 |
| 5,880,731 | A | * | 3/1999 | Liles et al. ................. 345/473 |
| 6,076,100 | A | * | 6/2000 | Cottrille et al. ............. 709/203 |
| 6,094,675 | A | * | 7/2000 | Sunaga et al. ................ 707/10 |
| 6,256,663 | B1 | * | 7/2001 | Davis ......................... 345/753 |

OTHER PUBLICATIONS

Krten, "Improving Usenet News Performance," *Dr. Dobb's Journal*, May 1996, pp. 66–70.

LaLiberte et al., "A protocol for scalable group and public annotations," *Computer Networks an ISDN Systems*, 27 (1995) 911–918.

Röscheisen et al., "Beyond browsing: shared comments, SOAPs, trails, and on–line communities," *Computer Networks and ISDN Systems*, 27 (1995) 739–749.

Rosenfeld, "Automated Filtering of Internet Postings," *ONLINE*, May 1994, pp. 27–30.

* cited by examiner

ELECTRONIC DISCUSSION SYSTEM FOR EXCHANGING INFORMATION AMONG USERS CREATING OPINION INDEXES IN ACCORDANCE WITH CONTENT OF EACH OPTIONS

This application is a continuation of Ser. No. 08/904,552 filed Aug. 4, 1997 now U.S. Pat. No. 6,094,675.

BACKGROUND OF THE INVENTION

The present invention relates to an electronic discussion system, and particularly to an electronic discussion system for exchanging information among a plurality of users through a network.

Heretofore, as an electronic discussion system using a network, there is a known electronic discussion system of the electronic bulletin board type, comprising a server machine including a function to accept requests for permission to present opinions (or messages) and a function to give permission to read opinions (or messages), and a client machine for accessing the server machine to perform opinion editing and writing processes. Information exchange in the electronic discussion system as described is achieved by storing information of all opinions in the server machine serving as a bulletin board.

As a system for sharing documents on the network, the "Reference System of Documents Scattered in the Network" revealed in JP-A-03-152641 is known by which a plurality of users refer to documents on the network.

In the electronic discussion system of the electronic bulletin board type according the prior art mentioned above, the server machine includes both the function to accept opinions (or messages) and the function to give permission to read opinions (or messages), for which reason, when many users participate in a discussion at the same point in time, the server machine is accessed concurrently by a number of client machines. Therefore, the processing load on the server machine is so heavy that the apparent processing performance of the system that is felt by the users trying to access it decreases greatly, which has been a problem.

In the prior art, the electronic discussion system is arranged such that, basically, only one server machine is used to record and manage all opinions (or messages) received, so that the load on the storage capacity in the server machine increases or decreases in proportion to the total amount of received opinion information. Another problem with the prior art is that as the total amount of received opinion information increases, the load on the storage capacity in the server machine increases. Accordingly, in a majority of the electronic discussion systems currently in use, this problem is avoided, as a rule, by limiting the kinds of opinion information to be recorded and managed to text data which imposes a relatively lesser load on the storage capacity.

SUMMARY OF THE INVENTION

The present inventors conducted the study from a standpoint of a user interested in discussions on many kinds of topics. Such a user makes access to the server machine charged with entry and management of opinions in various kinds of discussions at least once during a specific period of time to check to see if there is any opinion deserving attention. However, all unread opinions obtained by accessing the server machine are rarely objects of interest, and if no such opinion has been recorded, a problem is that accesses that have been made end up being wasteful.

With the foregoing in mind, the present invention has been made by the present inventors.

Therefore, a first object of the present invention is to provide an electronic discussion system in which even if requests to accept opinions (or messages) or grant permission to read opinions (or messages) concurrently come from a number of client machines, the processing load on the server machine will not become too large.

A second object of the present invention is to provide an electronic discussion system in which even if the total amount of received opinion information increases, the load on the storage capacity of a specific server machine is prevented from becoming too large.

A third object of the present invention is to provide an electronic discussion system which obviates the need to access the server machine only to check the contents of opinions.

To achieve the first and second objects mentioned above, the electronic discussion system according to the present invention includes servers for writing and managing opinion information, and clients for accessing the servers through a network, recording the opinion information in said servers, and referring to the opinion information which has already been recorded and which is being managed, wherein the servers comprise at least one storage server for holding detailed contents of various pieces of opinion information; and at least one discussion server for holding opinion indexes showing the storage locations of opinion contents of various pieces of opinion information corresponding to the opinion indexes, and wherein the clients comprise an opinion (or message) writing client for transferring and writing an opinion index made from newly received opinion information and the content of the newly received opinion itself into the discussion server and the storage server, respectively and a reading client for referring to the opinion indexes and the contents of the opinions which were recorded respectively in the discussion server and the storage server and which are being managed.

In the present invention, the discussion server holds many kinds of opinion list files classified by a topic, so that any of the opinion indexes can be selected as the object to express one's opinion about or the reading object. The reading client machine, responding to a specified reading instruction, searches the discussion server for the opinion indexes in the list files, which correspond to a specific topic as the reading object, and displays those opinion indexes. The reading client also and searches the storage server for an opinion content corresponding to a specific opinion index selected from the displayed opinion indexes and displays that opinion.

In the method described above, a part of the process related to expressing an opinion to a discussion and reading the contents of a discussion is executed by a client machine making the request to execute the process. Also, even if a number of client machines concurrently send requests for a process to express or read an opinion, the processing load will not become too heavy on a specific server machine. Moreover, a plurality of server machines (at least one discussion server and one storage server) are provided so that one piece of information about an opinion is divided into an opinion index and an opinion content when it is stored, and therefore even if the total amount of received opinion information increases, the load on the storage capacity on a specific server machine will not become too large.

To achieve the third object, in the present invention, the reading client machine is either a participating discussion reading client machine, for which at least one of the topics of discussion has been specified as a steady reading object, or a non-participating discussion reading client machine without any specified steady topic for reading. The discussion server machine holds a discussion participants list including information about the discussion topics specified as the steady reading objects by the participating discussion reading client machines, additionally records the opinion indexes sent from the opinion writing client machine onto the related opinion list file, and allots, according to the discussion participants list, the opinion indexes to all of the participated discussion reading client machines, for which topics have been specified as steady reading objects. Further, in the present invention, a user division server holding multiple kinds of list files of allotted opinion indexes sent from the discussion server and classified by the topics is provided for each group of participating discussion reading client machines. Each group includes at least one participating discussion reading client machine. The participating discussion reading client machine, according to a specified reading instruction, searches for the opinion indexes in the allotted opinion list file from the corresponding user division server, and displays the opinion indexes, and searches for an opinion content corresponding to a specific opinion index selected from the displayed opinion indexes, and displays the opinion.

Under the above arrangement, when any opinion is presented to a discussion in which a certain user is participating, since the opinion index of the received opinion is automatically allotted to the client machine that user is using or to the user division server to which the user belongs, it is not necessary for the user to check if there is any opinion which is of interest by making access to the discussion servers or the storage servers which are often located in relatively remote places.

DESCRIPTION OF THE PREFERRED EMBODIMENTS

The electronic discussion system according to an embodiment of the present invention will be described with reference to the accompanying drawings.

Figure 1:
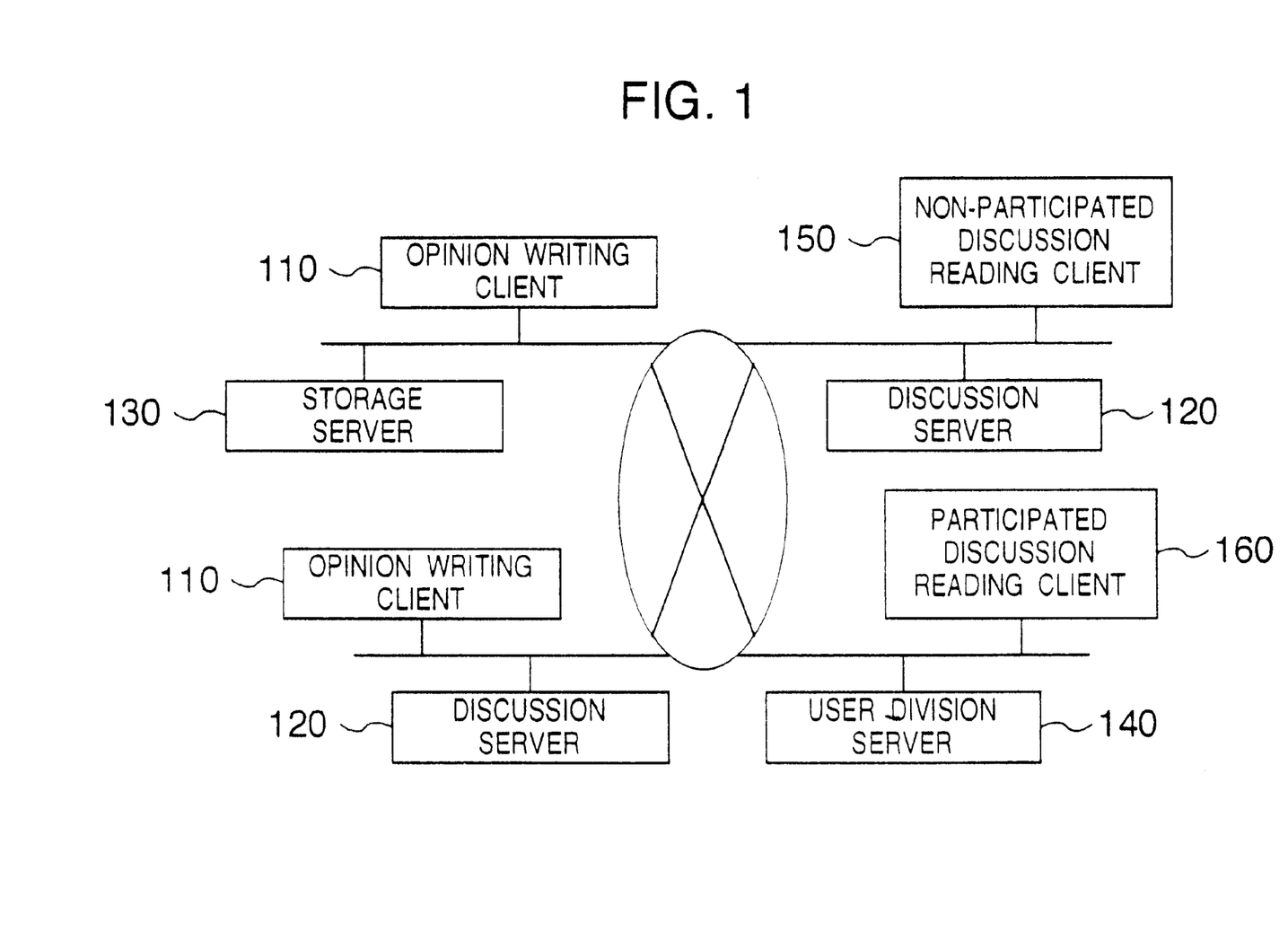
FIG. 1 is a diagram showing a schematic interconnection on a network of the electronic discussion system according to the present invention.
Figure 2:
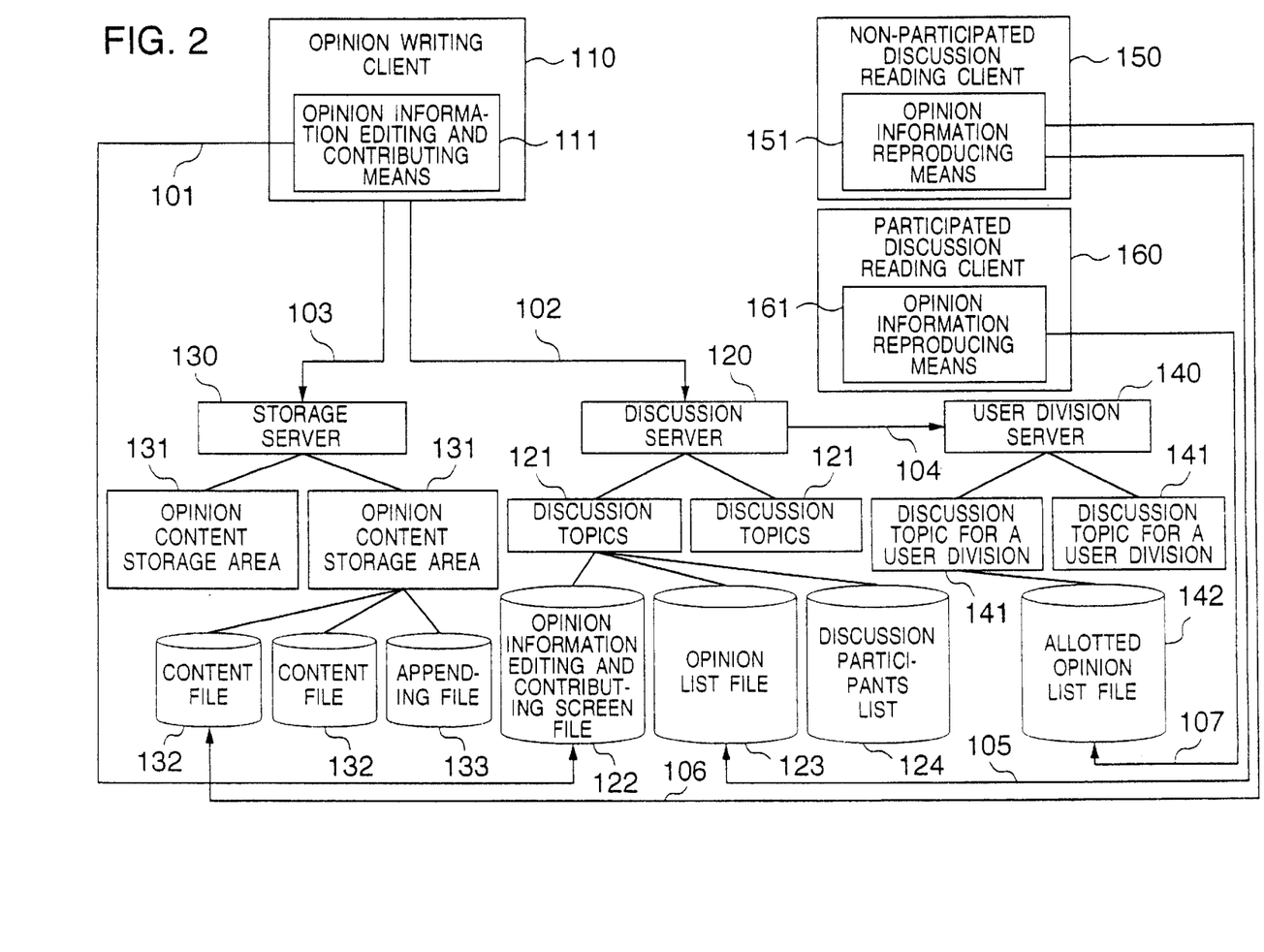
FIG. 2 is a diagram showing a basic configuration of the functions of the electronic discussion system according to the present invention.

FIG. 1 is a diagram showing a schematic interconnection on a network of the electronic discussion system according to the present invention. FIG. 2 is a diagram showing basic functions of the electronic discussion system according to the present invention. In FIGS. 1 and 2, 110 denotes an opinion writing client, 111 an opinion information editing and contributing means, 112 a discussion server, 121 discussion topics, 122 an opinion information editing and contributing screen file, 123 an opinion list file, 124 a discussion participants list, 130 a storage server, 131 opinion storage areas, 132 opinion content files, 133 an opinion appending file, 140 a user division server, 141 discussion topics for user divisions, 142 allotted opinion list file, 150 a non-participating discussion reading client, 151 an opinion information reproducing means, 160 a participating discussion reading client, and 161 an opinion information reproducing means.

Referring to FIGS. 1 and 2, the general operation of the electronic discussion system according to the present invention will be described briefly.

In FIGS. 1 and 2, a plurality of clients 110, 150, 160 and a plurality of servers 120, 130, 140 are connected with one another through a network, such as the Internet. The clients 110, 150 and 160 are divided according to the roles into two kinds: the opinion writing client 110 chiefly devoted to the opinion writing process, and the reading clients 150 and 160 chiefly devoted to the reading process. The reading clients 150 and 160 are further divided into the non-participating discussion reading client 150 and the participating discussion reading client 160, but this will be explained later on. The opinion writing client 110 is provided with an opinion information editing and contributing means 111 for smoothly pushing ahead with the user's editing and contributing work related to the opinion writing process, while on the other hand the reading clients 150 and 160 are provided respectively with opinion information reproducing means 151 and 161 to supply the user with opinion information referred to in the reading process. It ought to be noted that the opinion information editing and contributing means 111 and the opinion information reproducing means 151 and 161 according to this embodiment include a browser function often used to access the WWW (World Wide Web) sites on the Internet, for example. In this specification, the expression "to reproduce" means both "to display" static data such as texts and still images, and "to play" dynamic data such as speech sounds and animations.

Opinion information given by the user is divided into a opinion index decided uniquely by the speaker name, the title of opinion, time of presentation, etc., and the content of opinion. The opinion index and the opinion content are sent to different server machines (flows 102 and 103). The electronic discussion system according to this embodiment allots opinion indexes related to the topic of the discussion to the users participating in the discussion, in other words, to the users who have specified a specific topic 121 as a steady reading object. In order for the users to receive the allotted opinion indexes, a discussion system specific to an individual user which has similar functions to those of the general discussion system is prepared for each of the predetermined discussion topics for user divisions 141. To be more specific, the general discussion system receives the opinion indexes through the opinion writing client 110 (flow 102). In contrast, the discussion system specific to an individual user receives the opinion indexes allotted from the general discussion system (flow 104). Meanwhile, this embodiment assumes that multiple kinds of topics are handled concurrently, so that the above-mentioned discussion system specific to an individual user receives the opinion indexes for multiple kinds of topics.

The electronic discussion system according to this embodiment manages by classifying server machines into three types of the discussion server 120, the storage server 130, and the user division server 140 separately to have them execute the various processes mentioned above. The storage server 130 is a server machine to store the contents of opinions received, and includes an opinion storage area 131 for each client machine from which the opinions were transferred. The discussion server 120 prepares and stores opinion list files 123 containing opinion indexes and their corresponding opinion contents' storage locations with regard to each discussion topics 121. The discussion server 120, when an opinion has been recorded according to an opinion index newly transferred from the opinion writing client machine 110, checks the user participating in discussion on the relevant topic 121 by the discussion participants list 124, and allots the newly recorded opinion index to a user division server 140 to which the user belongs (flow 104). The user division server 140, on receiving the opinion index, prepares and stores an opinion list file 142 containing opinion indexes arranged for the respective discussion topics for user divisions of the participating users.

When a user, who does not specify what is his/her reading object, is going to refer to recorded opinion information, the user refers to the opinion list file 123 of the relevant topic held by the discussion server 120 from the non-participating discussion reading client 150 (flow 105). On the other hand, if the user specified a specific topic 121 as the steady reading object, he/she refers to an allotted opinion list file 142 of the relevant discussion topics for discussion topics for user divisions held by the user division server 140 from the participated discussion reading client 160. By so doing, the user knows the presence or absence of opinions related to the specified discussion topic. From the opinion index obtained from the discussion server 120 or the user division server 140, it is possible to know information about the storage server 130 containing the corresponding opinion content. Therefore, by changing over the reference object of the opinion information reproducing means 151 or 161 to the storage server 130, any desired opinion information can be obtained.

In the electronic discussion system according to this embodiment, the opinion information editing and contributing screen file 122, the opinion list file 123, and the opinion content files 132 are created in the hypertext form which defines various functions ("Text input area", "Software button", "Embed multimedia data", "Refer to another file", etc.) by writing with inherent control characters in the text. For example, in the opinion information editing and contributing screen file 122, "Text input area" in which the user writes the speaker's name, the title of opinion, opinion content, appending file name, etc., and "Software button" for transferring the written opinion content to the server are written using specified control characters. Also, in the opinion list file 123, an opinion index representing a piece of opinion information and the storage location of the corresponding opinion content added with control characters for "Refer to another file" are written on each line. When multimedia data, such as images or sounds, is attached for clear presentation of an opinion, control characters for "Embed multimedia data" are written in the opinion content file 132 to specify a file name of multimedia data.

The opinion information editing and contributing screen file 122, the opinion list file 123, and the opinion content file 132 created in the hypertext form mentioned above are analyzed by the opinion information editing and contributing means 111 prepared in the opinion client 110 or the opinion information reproducing means 151 or 161 prepared in the reading client 150 or 160, and then information is reproduced as designed by the creators of those files. For example, when the opinion editing and contributing means 111 reproduces the opinion information editing and contributing screen file 122, the text input area is displayed on the browser according to the control characters for "Text input area", so that the user is prompted to enter his/her opinion (flow 101). When the opinion information reproducing means 151 or 161 reproduce the opinion list file 123 or 142, the opinion indexes of selectable multiple kinds are shown on the browser, and the selector buttons are displayed in response to the control characters for "Software Button", so that the user is prompted to select opinion indexes (flows 105 and 107). When the user performs the above selecting operation, the opinion information reproducing means 151 or 161 switches over the display to the corresponding opinion content file 132 in response to the control characters for "Refer to another file." If there are the control characters for "Embed multimedia data" in the opinion content file 132, the opinion information reproducing means 151 or 161 also reads the related opinion-appending file 133, displays the opinion content file 132, and plays multimedia data, such as images or sounds.

The component parts of the electronic discussion system according to this embodiment will be described in greater detail.

In the opinion writing process for the user to contribute his/her opinion to the server machine, four kinds of machines, the opinion writing client 110, the discussion server 120, the storage server 130, and the user division server 140, are used to execute their respective processes.

Figure 3:
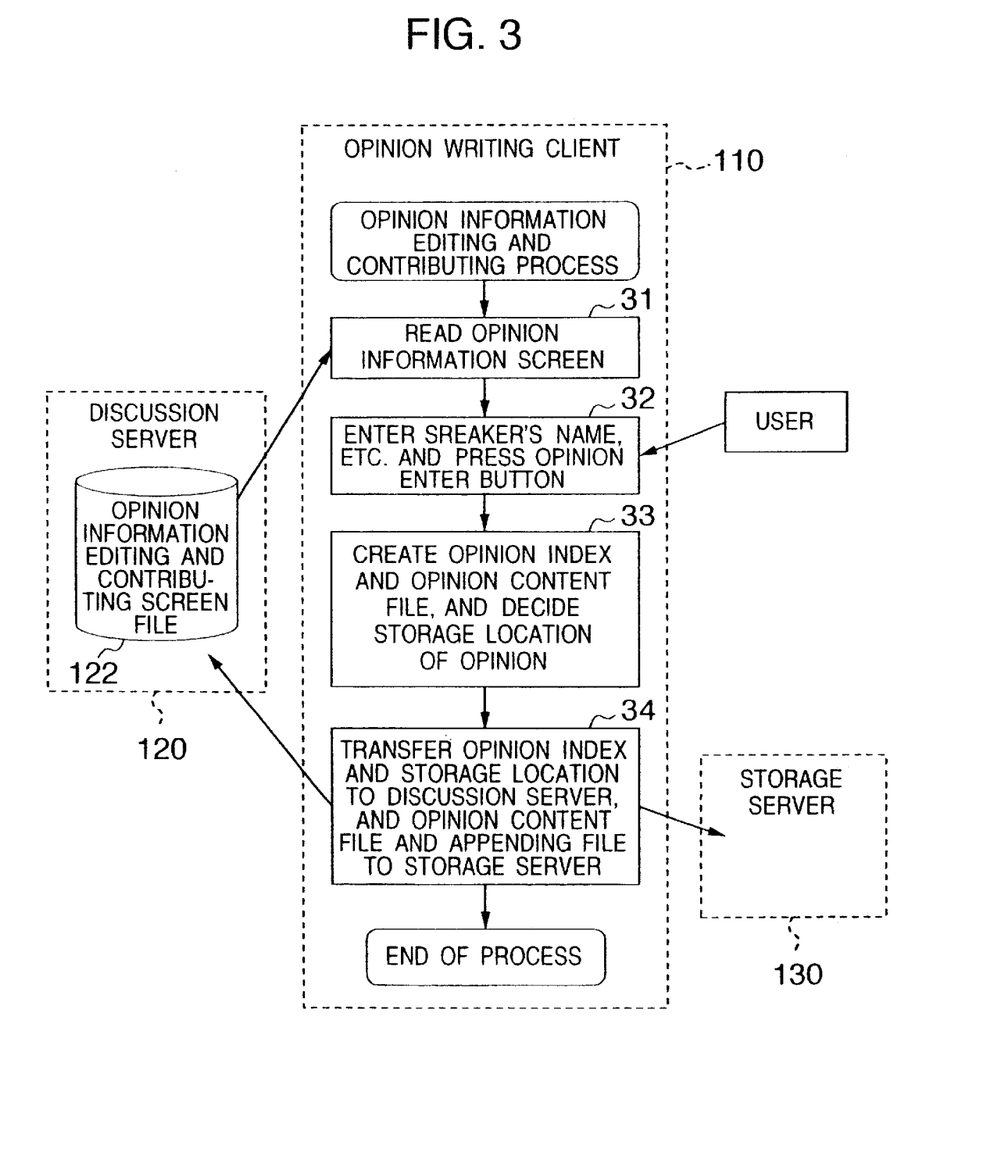
FIG. 3 is a diagram showing a basic flow of the opinion editing and sending processes in the opinion writing client machine in FIG. 2.

FIG. 3 is a diagram showing a basic flow of the opinion editing and sending process in the opinion writing client in FIG. 2. In FIG. 3, the opinion writing client 110, by its opinion information editing and contributing means 111, accesses the discussion server 120 containing a discussion topic on which a user wants to express his/her opinion, reads the opinion information editing and contributing screen file 122 in the related discussion topic 121, and displays opinion presenting screens on the browser (Step 31). During this step, the titles of topic as the reading objects are to be obtained. As described above, when the text input area is displayed on the opinion presenting screen displayed on the browser, the user inputs various text data, such as the speaker name, the title of opinion, the opinion content, by using the input device, such as a keyboard provided in the opinion writing client 110. At this time, if the user also contributes multimedia data, such as images or sounds, he/she inputs the file name of multimedia data in the text input area of the appending file name, and includes in the opinion content the control characters for "Embed Multimedia Data" specifying that file name as the appending file name. Then, the user expresses his/her opinion as follows. After having entered various items of data mentioned above, the user depresses the opinion enter button provided as a software button on the opinion presenting screen (Step 32). The opinion writing client 110, on detecting that the opinion enter button has been depressed, obtains the time of button depression, creates an opinion index from the speaker name, title of opinion, and time of opinion entry, and at the same time, creates an opinion content file from the opinion content, and decides the storage location (storage destination name) specified on the network according to information about the transfer of opinion content that the user designates (such as a storage server name, opinion writing client name, opinion content file name) (Step 33). Finally, those items of information which include the discussion topic to talk about, the opinion index, and the location of storage, etc. are sent to the discussion server 120, while the opinion content file and the opinion appending file including multimedia data, etc. which corresponds to the specified appending file name are sent to the storage server 130 (Step 34).

Figure 4:
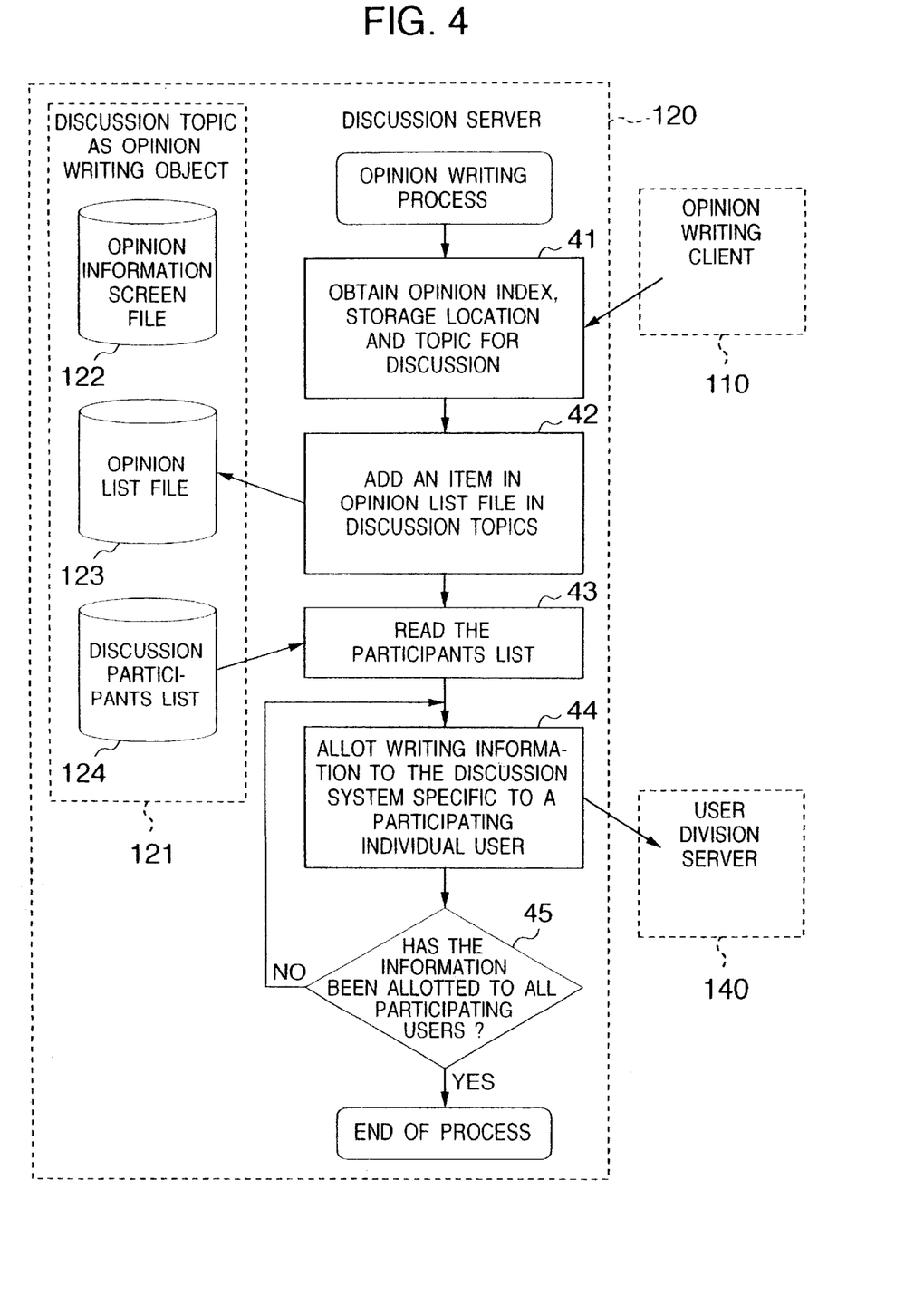
FIG. 4 is a diagram showing a basic flow of the opinion writing process in the discussion server in FIG. 2.

FIG. 4 is a diagram showing a basic flow of the opinion writing process in the discussion server in FIG. 2. In FIG. 4, the discussion server 120 receives a message that an opinion writing process has been done, and also obtains various items of information, such as an opinion index, the storage destination of an opinion content file, and a topic for discussion, sent from the opinion writing client 110 (Step 41). The discussion server 120 executes an opinion writing process in which the discussion server searches for the discussion topics 121 as the object of opinion writing according to the obtained topic, and opens the opinion list file 123 in the discussion topics 121, combines the opinion index with the opinion storage destination by using control characters for "Refer to another file", and adds the combined information as a new line in the opinion list file (Step 42). After this opinion writing process is finished, the discussion server 120 reads the discussion participants list 124 showing the participating users, that is, the users who specified this discussion topic 121 as the steady reading object (Step 43), and allots writing information, such as the opinion index, discussion topic, storage destination of the opinion content file to the discussion system specific to an individual user participating in the discussion (Step 44). Until this allotment is finished for all the participating users, the allotting process of Step 44 is repeated (Step 45).

Figure 5:
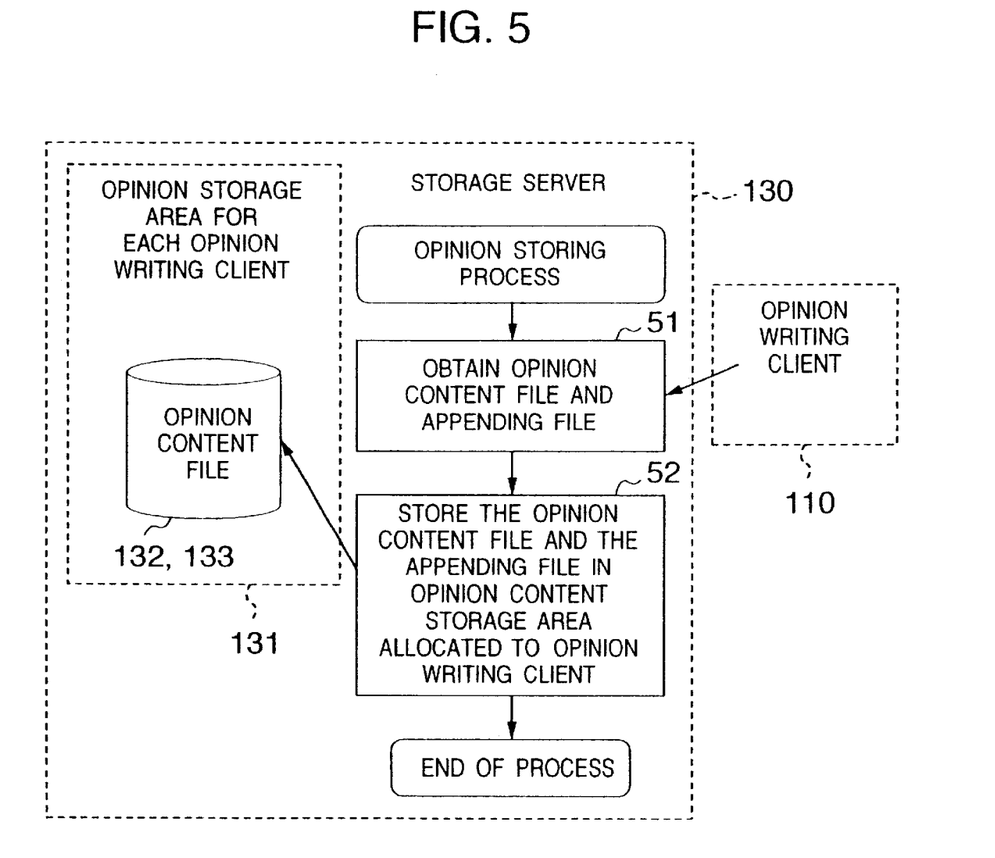
FIG. 5 is a diagram showing a basic flow of the opinion storing process in the storage server in FIG. 2.

FIG. 5 is a diagram showing a basic flow of the opinion storing process in the storage server in FIG. 2. In FIG. 2, the discussion server 120 receives a message that an opinion writing process has been done, and also obtains information about the opinion writing client name, the opinion content file 132, and an appending file 133 if necessary (Step 51). The storage server 130 stores the opinion content file 132 and the appending file 133 in the dedicated opinion content storage area 131 allocated in advance to the obtained opinion writing client machine name (Step 52).

Figure 6:
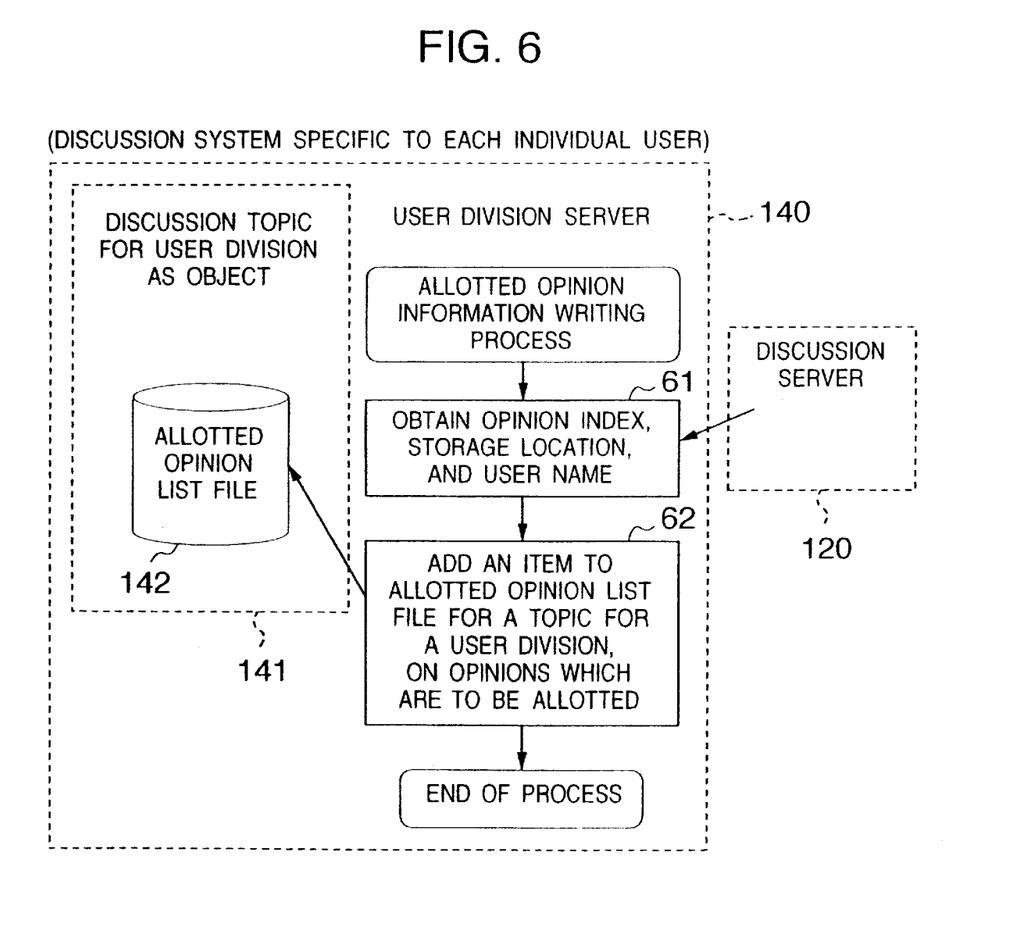
FIG. 6 is a diagram showing a basic flow of the allotted opinion list file writing process in the user division server in FIG. 2.

FIG. 6 is a diagram showing a basic flow of the allotted opinion list file in the user division server in FIG. 2. In FIG. 6, the user division server 140, which is a component part of the discussion system specific to each individual user, receives a message that an allotting process has been done, and also obtains information about the opinion index, the storage destination of the opinion content file, the participating user, transferred from the discussion server 120 (Step 61). In FIG. 6, the user division server 140 performs the allotting process, in which the user division server, according to the obtained participating user name, searches for the discussion topic for a user division 141, opinions on which are to be allotted, opens the opinion list file 142 that the discussion topic for the user division 141 include, then combines the opinion index with the opinion storage destination by using the control characters for "Refer to another file", and adds the combined information as a new line to the opinion list file (Step 62).

Figure 7:
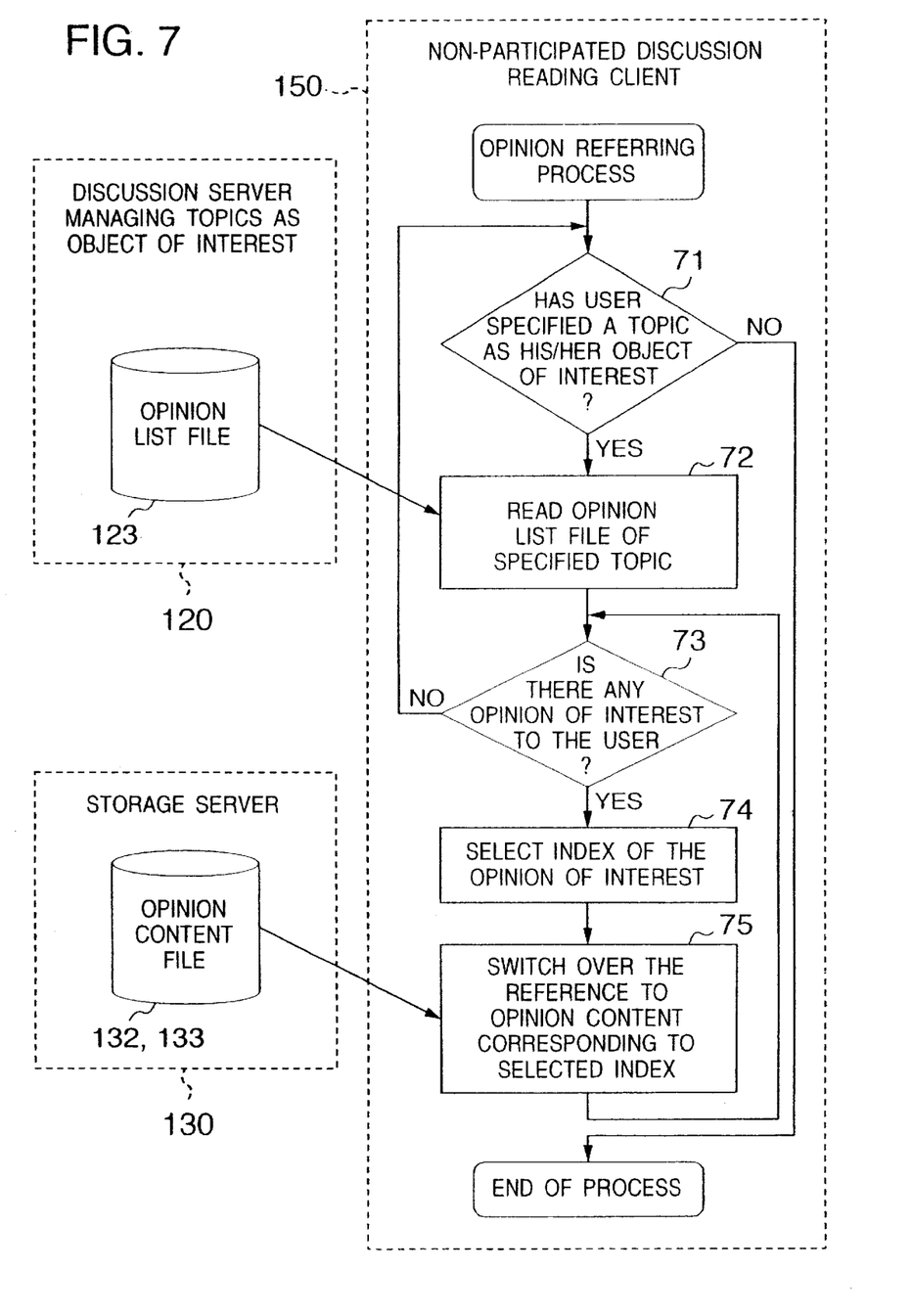
FIG. 7 is a diagram showing a basic flow of the opinion referring process in the non-participating discussion reading client machine in FIG. 2.

FIG. 7 is a diagram showing a basic flow of the opinion referring process in the non-participating discussion reading client in FIG. 2. In FIG. 2, when the user specifies a discussion topic 121 as his/her object of interest (Step 71=Yes), the non-participating reading client 150 accesses the discussion server 120 managing the discussion topics 121, and by using the opinion information reproducing means 151, such as a browser, reads and displays the opinion list file 123 of the specified discussion topic 121 (Step 72). If there is any opinion of interest to the user in the displayed opinion list (Step 73: Yes), he/she selects the opinion index of that opinion (Step 74). Accordingly, the opinion information reproducing means 151 switches over the referring process to the opinion content file 132 at the storage destination corresponding to the selected opinion index and the appending file 133, including multimedia data, etc., (Step 75), and the user reads the opinion content.

Figure 8:
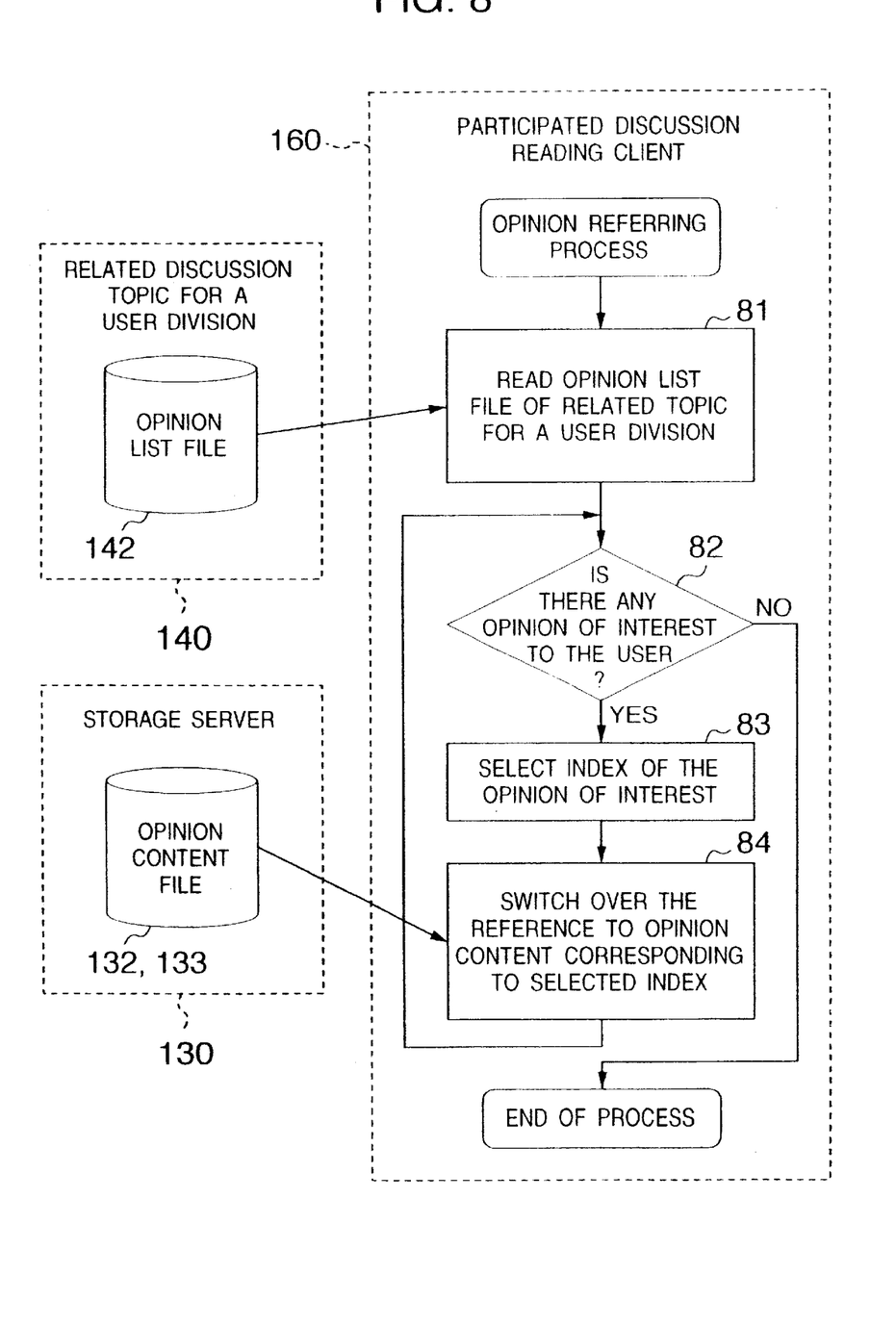
FIG. 8 is a diagram showing a basic flow of the opinion referring process in the participating discussion reading client machine in FIG. 2.

FIG. 8 is a diagram showing a basic flow of the opinion referring process in the participating discussion reading client in FIG. 2. In FIG. 2, the participated discussion reading client 160 accesses the user division server 140 controlling the related discussion topics for user divisions 141, and reads and displays the opinion list file 142 of the discussion topics for user divisions 141 through the opinion information reproducing means 161, such as a browser (Step 81). If there is any opinion of interest to the user in the displayed opinion list (Step 82: Yes), he/she selects the opinion index of the opinion (Step 83). Accordingly, the opinion information reproducing means 161 switches over the referring process to the opinion content file 132 at the storage destination corresponding to the selected opinion index and the appending file 133, including multimedia data, etc. (Step 84), and thus the user reads the opinion content.

As has been described in great detail, in the electronic discussion system according to claims of the present invention, a part of processing related to writing the user's opinion to a discussion and reading the contents of a discussion is executed by the client machine requesting that processing should be done. Therefore, even if requests for input/output processing of opinions are made concurrently from a number of client machines, the processing load will not become too heavy on a specific server machine. In this electronic discussion system, a plurality of server machines (at least one discussion server and one storage server) are provided, so that a piece of opinion information is divided into an opinion index and the content of opinion when it is stored. Therefore, even if the total amount of opinion information increases, the load on the storage capacity in a specific server machine will not become too heavy.

In the electronic discussion system according to other claims of the present invention, if any opinion arises in the discussion in which a number of users are participating, the index of that opinion is automatically allotted to client machines utilized by users who are participating or the server machine to which they belong. Therefore, this invention obviates the need to access the discussion servers and storage servers often located in relatively distant places only to check the contents of opinions.

What is claimed is:

1. An electronic discussion system comprising:
   a discussion apparatus for storing contents of input opinions so as to have correspondence relationships with discussion topics to which the contents pertain, contents of input opinions having correspondence relationships with discussion topics in which registered users participate further having correspondence relationships with user divisions corresponding to the registered users;
   a participated discussion reading terminal responsive to an operation instruction from a registered user, for referring to and displaying contents of input opinions stored in said discussion apparatus and having a corresponding relationship with a user division corresponding to the registered user; and a non-participated discussion reading terminal responsive to an operation instruction from a user other than the registered users, for inputting an instruction for selecting a discussion topic, and obtaining and displaying contents of input opinions stored in said discussion apparatus and having a correspondence relationship with the selected discussion topic, wherein said discussion apparatus includes:

a storage unit for storing the contents of input opinions;

a discussion manager unit for storing opinion indexes to be used for users to specify, each of opinion indexes being created in accordance with a content of each of stored opinions, and said opinion indexes having correspondence relationships with the contents of stored opinions and with discussion topics to which corresponding contents of the stored opinions pertain, said discussion manager unit outputting user information as to users who participate the stored discussion topics and the stored opinion indexes; and a user division manager unit for inputting the user information and the opinion indexes thus outputted and storing the user information so as to have corresponding relationships with the user divisions.

2. The electronic discussion system according to claim 1, further comprising an opinion writing terminal including:

a unit for creating an opinion index based on a title of an opinion, content of the opinion and presentation time of the opinion, and sending a storage location of the content of the opinion stored in said storage unit and the opinion index thus created to said discussion manager unit; and a unit for sending the content of the opinion and an attachment file designated by the content of the opinion to said storage unit.

3. The electronic discussion system according to claim 1, wherein said non-participated discussion reading terminal includes:

a unit for obtaining, from said discussion manager unit, opinion indexes corresponding to a discussion topic specified by a user, and creating and displaying an opinion list based on the opinion indexes thus obtained; and a unit responsive to an instruction for selecting an opinion list from a user, for obtaining from said storage unit content of opinion corresponding to an opinion index specified by the user, and displaying the content of the opinion thus obtained.

4. The electronic discussion system according to claim 1, wherein said participated discussion reading terminal includes:

a unit for obtaining, from said division manager unit, opinion indexes having a correspondence relationships with a user division corresponding to a user, and creating and displaying an opinion list based on the opinion indexes thus obtained; and a unit responsive to an instruction for selecting an opinion list from a user, for obtaining from said storage unit content of opinion corresponding to an opinion index specified by the user, and displaying the content of the opinion thus obtained.

5. The electronic discussion system according to claim 1, wherein the contents of input opinions include multimedia data, such as still images, sounds, and moving images in addition to character data.

6. An electronic discussion method comprising:

storing contents of input opinions so as to have correspondence relationships with discussion topics to which the contents of stored opinions pertain, the contents of stored opinions having correspondence relationships with discussion topics in which registered users participate further having correspondence relationships with user divisions corresponding to the registered users;

storing opinion indexes each created in accordance with a content of each of stored opinions, the opinion indexes having correspondence relationship with the content of stored opinions and with discussion topics to which the contents of stored opinions pertain;

if an operation instruction is received from a registered user, referring to and displaying the opinion indexes to the user and, when the user selects an opinion index, obtaining and displaying contents of stored opinions corresponding to the selected opinion index and having a corresponding relationship with a user division of the registered user; and if an operation instruction is received from a user other than the registered users, inputting an instruction for selecting a discussion topic, referring to and displaying the opinion indexes to the user and, when the user selects an opinion index, obtaining and displaying contents of stored opinions corresponding to the selected opinion index and having a correspondence relationship with the selected discussion topic.

7. The electronic discussion method according to claim 6, wherein the contents of input opinions include multimedia data, such as still images, sounds, and moving images in addition to character data.

8. An electronic discussion method comprising:

storing contents of input opinions so as to have correspondence relationships with discussion topics to which the contents of stored opinions pertain, the contents of stored opinions having correspondence relationships with discussion topics in which registered users participate further having correspondence relationships with user divisions corresponding to the registered users;

storing opinion indexes each created in accordance with a content of each of stored opinions, the opinion indexes having correspondence relationship with the content of stored opinions and with discussion topics to which the contents of stored opinions pertain;

if a request for display of contents of stored opinions is received from a registered user, referring to and displaying the opinion indexes to the user and, when the user selects an opinion index, obtaining and displaying contents of stored opinions corresponding to the selected opinion index and having a corresponding relationship with a user division of the registered user; and if a request for display of contents of stored opinions is received from a user other than the registered users, inputting an instruction for selecting a discussion topic, referring to and displaying the opinion indexes to the user and, when the user selects an opinion index, obtaining and displaying contents of stored opinions corresponding to the selected opinion index and having a correspondence relationship with the selected discussion topic.

9. The electronic discussion system according to claim 8, wherein the contents of input opinions include multimedia data, such as still images, sounds, and moving images in addition to character data.

10. A computer readable medium comprising instructions that, when executed by a computer system, perform the method comprising:

storing contents of input opinions so as to have correspondence relationships with discussion topics to which the contents of stored opinions pertain, the contents of stored opinions having correspondence relationships with discussion topics in which registered users participate further having correspondence relationships with user divisions corresponding to the registered users;

storing opinion indexes each created in accordance with a content of each of stored opinions, the opinion indexes having correspondence relationship with the content of stored opinions and with discussion topics to which the contents of stored opinions pertain;

if a request for display of contents of stored opinions is received from a registered user, referring to and displaying the opinion indexes to the user and, when the user selects an opinion index, obtaining and displaying contents of stored opinions corresponding to the selected opinion index and having a corresponding relationship with a user division of the registered user; and if a request for display of contents of stored opinions is received from a user other than the registered users, inputting an instruction for selecting a discussion topic, referring to and displaying the opinion indexes to the user and, when the user selects an opinion index, obtaining and displaying contents of stored opinions corresponding to the selected opinion index and having a correspondence relationship with the selected discussion topic.

\* \* \* \* \*